United States Patent
Shimotakahara et al.

(10) Patent No.: US 6,522,819 B2
(45) Date of Patent: Feb. 18, 2003

(54) OPTICAL FIBER AND OPTICAL TRANSMISSION LINE USING THE OPTICAL FIBER

(75) Inventors: Iwao Shimotakahara, Tokyo (JP); Hideya Moridaira, Tokyo (JP); Junichi Tamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/985,363

(22) Filed: Nov. 2, 2001

(65) Prior Publication Data

US 2002/0054742 A1 May 9, 2002

(30) Foreign Application Priority Data

Nov. 7, 2000 (JP) .......................... 2000-339310

(51) Int. Cl.$^7$ ................................. G02B 6/02
(52) U.S. Cl. ...................... 385/123; 385/124
(58) Field of Search ................. 385/123, 124, 385/125, 126, 127, 128

(56) References Cited

U.S. PATENT DOCUMENTS 5,748,824 A * 5/1998 Smith ...................... 385/124
6,430,347 B1 * 8/2002 Cain et al. ................ 385/123
6,442,320 B1 * 8/2002 Danziger et al. .......... 385/123
6,456,770 B1 * 9/2002 Sansonetti et al. ........ 385/123

FOREIGN PATENT DOCUMENTS

EP          0949520 A1 * 10/1999 ........... G02B/6/16

* cited by examiner

Primary Examiner—Akm E. Ullah
Assistant Examiner—Jennifer Doan
(74) Attorney, Agent, or Firm—Oblon, Spivak, McClelland, Maier & Neustadt, P.C.

(57) ABSTRACT

An optical fiber for forming an optical transmission line suitable for the wavelength division multiplexing transmission by connecting to a positive dispersion optical fiber is provided. Outside a first glass layer (1), a second glass layer (2), a third glass layer (3) and a fourth glass layer (4) are sequentially disposed. The fourth glass layer (4) is to be a reference layer for a standard of a refractive index. A relative refractive index difference $\Delta 1$ of the first glass layer to the reference layer is set 1.6% to 2.6%, inclusive, a relative refractive index difference $\Delta 2$ of the second glass layer is set $-0.65\%$ to $-0.4\%$, inclusive, and a relative refractive index difference $\Delta 3$ of the third glass layer is set 0.15% to 0.5%, inclusive.

4 Claims, 2 Drawing Sheets

OPTICAL FIBER AND OPTICAL TRANSMISSION LINE USING THE OPTICAL FIBER

FIELD OF THE INVENTION

The present invention relates to an optical fiber and an optical transmission line using the optical fiber, particularly to an optical transmission medium suitable for the wavelength division multiplexing (WDM) transmission.

BACKGROUND OF THE INVENTION

With the development of the information society, the volume of communication information tends to increase dramatically. According with such increasing information, the wavelength division multiplexing transmission has been widely received in communication fields. The wavelength division multiplexing transmission is a system where light having a plurality of wavelengths is transmitted through one optical fiber.

Currently, as optical amplifiers applied to relay points for the wavelength division multiplexing transmission, an optical amplifier using an erbium doped optical fiber (EDFA) has been developed. This optical amplifier amplifies signals as they are in the state of optical signals without converting the optical signals to electric signals. It is eliminated that the optical signals are converted to the electric signals at every wavelength in the relay points, which is accelerating the development of the wavelength division multiplexing transmission.

SUMMARY OF THE INVENTION

The invention is to provide an optical fiber suitable for the wavelength division multiplexing transmission and an optical transmission line using the optical fiber. The optical fiber in the invention comprising:

both dispersion and a dispersion slope in a waveband of 1570 to 1615 nm being negative values;

a bending loss at a diameter 20 mm in the waveband being 3 dB/m or under;

a transmission loss in the waveband being 0.3 to 0.8 dB/km, inclusive;

a value of polarization mode dispersion in the waveband being 0.5 ps·km$^{-½}$ or under;

a value that an absolute vale of a dispersion value is divided by the transmission loss in the waveband being 170 or above; and a value that the dispersion value is divided by the dispersion slope in the waveband being 270 to 450, inclusive.

BRIEF DESCRIPTION OF THE DRAWINGS

Exemplary embodiments of the invention will now described in conjunction with drawings in which.

DETAILED DESCRIPTION

In the wavelength division multiplexing transmission, major factors that hider the realization of speeding up optical signal transmission are chromatic dispersion and non-linearity. When chromatic dispersion is great, the waveform deterioration of the optical signals to be transferred proceeds and high-speed transmission cannot be conducted. However, in the meantime, when chromatic dispersion comes close to zero, four wave mixing (FWM) that is one of non-linear phenomena is generated and distortion in signal waveforms causes the wavelength division multiplexing transmission difficult.

As for a measure for suppressing both the chromatic dispersion and non-linearity, proposed is an optical transmission line where two kinds or more of optical fibers not having zero dispersion in a transmission band of optical signals are connected. The proposal is that the chromatic dispersion is allowed to come close to zero throughout the optical transmission line by connecting a positive dispersion optical fiber to a negative dispersion optical fiber. The optical transmission line of the proposal is disclosed in Japanese Patent Laid-Opens (No. 11620/1994 and No. 313750/1996). The optical transmission lines of these proposals use a waveband of 1520 to 1570 nm as the optical signal transmission band.

In order to further increase transmission capacities in the wavelength division multiplexing transmission, an optical transmission line is needed that can suppress optical signal distortions due to both chromatic dispersion and non-linear phenomena in a brader waveband. However, all the techniques of the proposals are techniques for a waveband of 1570 nm or under, which cannot be applied to the wavelength division multiplexing transmission in a waveband exceeding a wavelength of 1570 nm as they are. On this account, broadening transmission bands in the wavelength division multiplexing transmission has been difficult traditionally.

In one aspect of the invention, it is to provide an optical fiber allowing an excellent wavelength division multiplexing transmission using a waveband of 1570 nm or above in particular.

Figure 1:
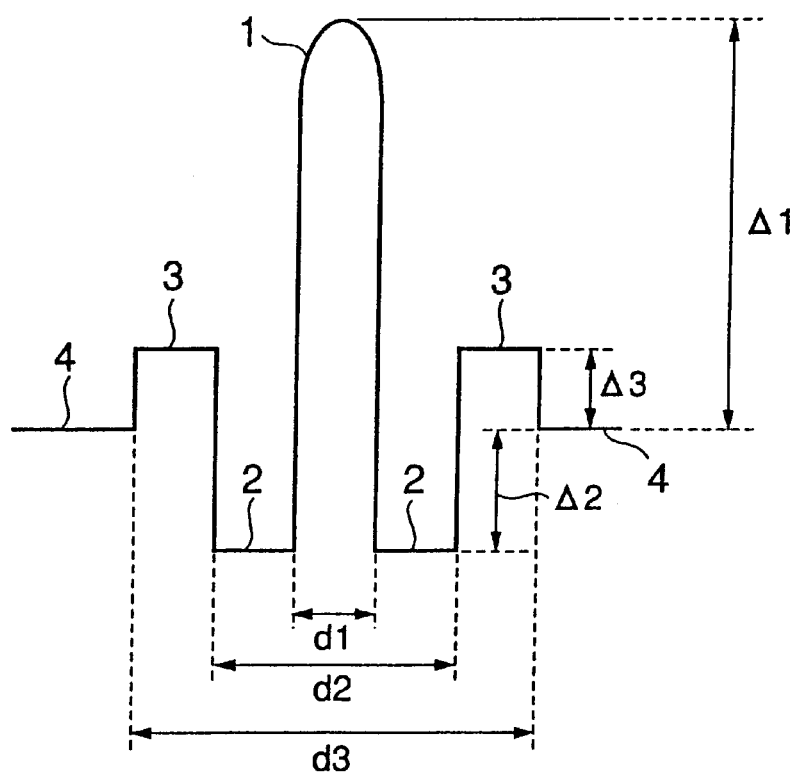
FIG. 1 depicts a diagram illustrating a refractive index profile of one embodiment of the optical fiber in the invention.

FIG. 1 depicts a refractive index profile of one embodiment of the optical fiber in the invention. As for the refractive index profile of the optical fiber, various refractive index profiles can be acceptable. As one example, the refractive index profile, as shown in FIG. 1, is adapted in the embodiment that has a relatively simple structure where the refractive index structure is easily designed and controlled.

The optical fiber of the embodiment has multiple (four layers here) glass layers (a first glass layer 1, a second glass layer 2, a third glass layer 3 and a fourth glass layer 4) having a different composition in adjacent layers. A reference layer for a standard of a refractive index distribution is the fourth glass layer 4 among the glass layers. Inside the fourth glass layer 4, three grass layers, the first glass layer 1, the second glass layer 2 and the third glass layer 3, are formed. The first glass layer 1 is positioned at the center of the refractive index distribution, having the maximum refractive index. Outside the first glass layer 1, the second glass layer 2 is positioned. Outside thereof, the third glass layer 3 is positioned.

In FIG. 1, Δ1 indicates a relative refractive index difference of the first glass layer 1 to the reference layer 4. Δ2 indicates a relative refractive index difference of the second glass layer 2 to the reference layer 4. Δ3 indicates a relative refractive index difference of the third glass layer 3 to the reference layer 4.

In the specification, the relative refractive differences Δ1, Δ2 and Δ3 are defined by the following equations (1) to (3), where a refractive index of the maximum refractive index part in the first glass layer 1 is set $n_1$, a refractive index of the minimum refractive index part in the second glass layer 2 is set $n_2$, a refractive index of the maximum refractive index part in the third glass layer 3 is set $n_3$, and a refractive index of the reference layer 4 is set $n_4$:

$$\Delta 1 = \{(n_1 - n_4)/n_1\} \times 100 \qquad (1)$$

$$\Delta 2 = \{(n_2 - n_4)/n_2\} \times 100 \qquad (2)$$

$$\Delta 3 = \{(n_3 - n_4)/n_3\} \times 100 \qquad (3)$$

In the embodiment, it is set $1.6\% \leq \Delta 1 \leq 2.6\%$, $-0.65\% \leq \Delta 2 \leq -0.4\%$, and $0.15\% \leq \Delta 3 \leq 0.5\%$. Additionally, it is set $2.5 \leq (d2/d1) \leq 3.0$, and $1.5\% \leq (d3/d2) \leq 3.0$, where an outer diameter of the first glass layer 1 is set d1, an outer diameter of the second glass layer 2 is set d2, and an outer diameter of the third glass layer 3 is set d3.

Figure 2:
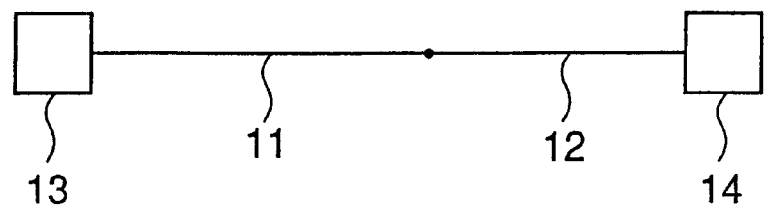
FIG. 2 depicts an illustration showing an example of an optical communication system using the optical fiber of the embodiment.

For example, as shown in FIG. 2, the optical fiber of the embodiment is connected to a positive dispersion optical fiber such as a single mode optical fiber having zero dispersion in a waveband of 1 to 3 μm (more specifically, that has zero dispersion in a waveband of 1.31 μm) and is adapted to a wavelength division multiplexing transmission line in a waveband of 1570 to 1615 nm. At this time, the optical fiber of the embodiment having the refractive index distribution functions as a property improving optical fiber. Then, the optical fiber of the embodiment (property improving optical fiber) compensates the dispersion and dispersion slope of the positive dispersion optical fiber in the waveband of 1570 to 1615 nm.

The example shown in FIG. 2, the positive dispersion optical fiber 11 side of the optical transmission line (wavelength division multiplexing transmission line) is connected to a signal light transmitter 13 and the optical fiber (property improving optical fiber) 12 of the embodiment is connected to a signal light receiver 14 for configuring a wavelength division multiplexing transmission system.

In this system, when the wavelength division multiplexing transmission is conducted using light signals of the waveband of 1570 to 1615 nm, positive dispersion of each wavelength in the waveband increases as transmitting through the positive dispersion optical fiber 11. After that, light signals of each wavelength multiplexed is switched from the positive dispersion optical fiber 11 to the optical fiber 12 of the embodiment for transmission.

The optical fiber 12 of the embodiment has a negative dispersion value and a negative dispersion slope in the waveband of 1570 to 1615 nm. Therefore, the positive dispersion having increased as transmitting through the positive dispersion optical fiber 11 is compensated in the direction where it is gradually diminished by the negative dispersion value of the optical fiber 12 as transmitting through the optical fiber 12. Additionally, similarly, the positive dispersion slope in the waveband of the positive dispersion optical fiber 11 is compensated in the direction where it is diminished by the negative dispersion slope of the optical fiber 12.

In the optical fiber 12 of the embodiment, a value that a dispersion value in the waveband is divided by the dispersion slope (DPS) is set to a value close to a DPS value of the positive dispersion optical fiber (substantially the same), 270 to 450, inclusive. Accordingly, the dispersion of each wavelength of the wavelength multiplexed light is to be compensated to zero at the end side of the optical fiber 12 in the optical transmission line described above.

In this manner, the optical fiber 12 of the embodiment is connected to the positive dispersion optical fiber 11 to form an optical transmission line and thereby a low dispersion optical transmission line is configured in the waveband of 1570 to 1615 nm.

Additionally, in the optical fiber 12 of the embodiment, a transmission loss in the waveband is to be 0.3 to 0.8 dB/km, inclusive. The range of the transmission loss is the optimum range of the transmission loss in the waveband. Generally, when the transmission loss in the transmitting waveband is too small, wavelength multiplexed light signals over the acceptable limit in an optical transmission system are to be inputted into an optical fiber. The intensity of the light signals becomes excessive, non-linear phenomena might be generated in signals propagating through the optical fiber. In order to suppress the non-linear phenomena, the need for inserting an optical attenuator into the receiving side (the incident side of the optical fiber) of the wavelength multiplexed light might occur. To this, the optical fiber 12 of embodiment sets the transmission loss in the waveband to 0.3 to 0.8 dB/km, inclusive. Having such a well-moderated loss can avoid effort of inserting the optical attenuator or complication of the optical transmission system.

Furthermore, the transmission loss is set to a well-moderated value. Thus, the optical transmission line formed by connecting the positive dispersion optical fiber 11 to the optical fiber 12 of the invention can optically transmit the wavelength multiplexed light without increasing the transmission loss in the waveband.

Moreover, in the optical fiber 12 of the invention, a value of polarization mode dispersion is set $0.50 \text{ ps}\cdot\text{km}^{-1/2}$ or under. Thus, distortion due to polarization mode dispersion can be suppressed as well. When the wavelength multiplexed light in the waveband is passed through the optical fiber 12 of the invention, the wavelength multiplexed light can be transmitted without trouble with the distortion due to polarization mode dispersion nearly equal to the extent that wavelength multiplexed light is passed through a currently used single mode optical fiber or dispersion shifted fiber.

Besides, in the optical fiber 12 of the invention, a bending loss at a bending diameter of 20 mm is set 3 dB/m or under. Thus, an increase in the bending loss due to the optical fiber bending can be prevented surely.

In addition, the refractive index profile of the optical fiber is formed to have the configuration shown in FIG. 1. Thereby, the fabrication of the optical fiber 12 of a refractive index structure having the set conditions can be facilitated. Then, optical transmission characteristics of the wavelength division multiplexing transmission line configured of the optical fiber 12 of the embodiment and the positive dispersion optical fiber 11 can be enhanced. According to this, creation of a high-quality wavelength division multiplexing transmission system can be intended in the waveband of 1570 to 1615 nm.

Next, each of sample fabrications of the optical fiber in the invention will be described. The inventor in fact fabricated optical fibers of sample 1, sample 2 and sample 3, where each of the relative refractive index differences $\Delta 1$, $\Delta 2$ and $\Delta 3$ and each of the outer diameters d1, d2 and d3 are set to values within the range of the embodiment. Design values of refractive index profiles of the optical fibers of sample 1, sample 2 and sample 3 are: the relative refractive index difference $\Delta 1 = 2.2\%$, $\Delta 2 = -0.55\%$ and $\Delta 3 = 0.25$, and d1:d2:d3=1:2.8:5.6.

The optical fiber of sample 1 was formed into an optical fiber having the following characteristics in a wavelength of 1590 nm. That is, a transmission loss in the wavelength of 1590 nm is 0.44 dB/km, a dispersion value is −78 ps/nm/km, a value that the dispersion value is divided by a dispersion slope is 291, a value that the absolute value of the dispersion value is divided by the transmission loss is 177, a bending loss at a diameter of 20 mm is 0.1 dB/m, and a value of polarization mode dispersion is 0.20 ps·km$^{-½}$ or under. Additionally, a cutoff wavelength of the optical fiber of sample 1 is 1700 nm or under.

The optical fiber of sample 2 was formed into an optical fiber having the following characteristics in a wavelength of 1590 nm. That is, a transmission loss in the wavelength of 1590 nm is 0.45 dB/km, a dispersion value is −100 ps/nm/km, a value that the dispersion value is divided by a dispersion slope is 295, a value that the absolute value of the dispersion value is divided by the transmission loss is 222, a bending loss at a diameter of 20 mm is 0.2 dB/m, and a value of polarization mode dispersion is 0.20 ps·km-½ or under. Furthermore, a cutoff wavelength of the optical fiber of sample 2 is 1440 nm.

In addition, when each characteristic in a wavelength of 1550 nm was measured in the optical fiber of sample 2, the following results were obtained. That is, a transmission loss in the wavelength of 1550 nm was 0.45 dB/km, a value that the dispersion value is divided by a dispersion slope was 296, a value that the absolute value of the dispersion value is divided by the transmission loss was 231, and a bending loss at a diameter of 20 mm was 0.1 dB/m.

Figure 3:
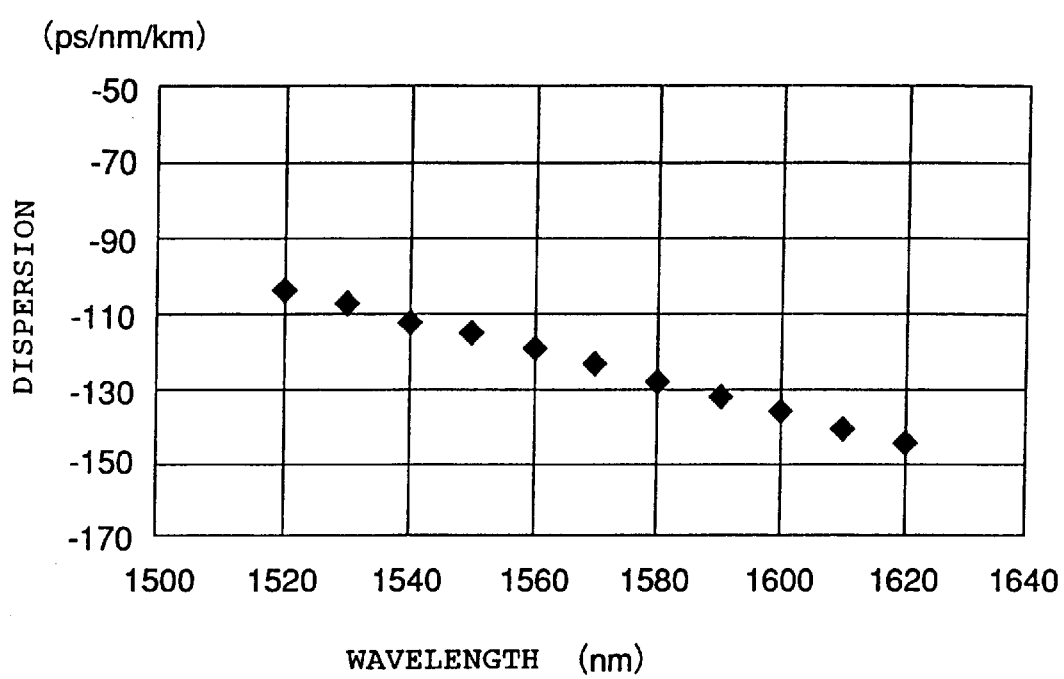
FIG. 3 depicts a graph illustrating chromatic dispersion characteristics of one sample fabrication of the optical fiber in the invention.

Moreover, the chromatic dispersion characteristics of the optical fiber of sample 3 were characteristics shown in FIG. 3. The optical fiber of sample 3 was formed into an optical fiber having the following characteristics in a wavelength of 1590 nm. That is, a transmission loss in the wavelength of 1590 nm is 0.45 dB/km, a dispersion value is −132 ps/nm/km, a dispersion slope is −0.417 ps/nm/km, a value that the dispersion value is divided by the dispersion slope is 318, a value that the absolute value of the dispersion value is divided by the transmission loss is 293, a mode field diameter is 4.4 μm, a bending loss at a diameter of 20 mm is 0.2 dB/m, and a value of polarization mode dispersion is 0.20 ps·km$^{-½}$ or under.

Besides, when each characteristic in a wavelength of 1550 nm was measured in the optical fiber of sample 3, the following results were obtained. That is, a transmission loss in the wavelength of 1550 nm was 0.45 dB/km, a value that the dispersion value is divided by a dispersion slope was 289, a value that the absolute value of the dispersion value is divided by the transmission loss was 258, and a bending loss at a diameter of 20 mm was 0.2 dB/m.

The optical fibers of samples 1 to 3 have the aforesaid characteristics. Therefore, the excellent effects described in the embodiment can be exerted.

In addition, as apparent from the results that the characteristics of the optical fibers of samples 2 and 3 were considered, the same characteristics as those in the waveband of 1570 to 1615 nm could be obtained in the waveband of 1530 to 1570 nm.

That is, the optical fibers of samples 2 and 3 are formed into optical fibers, which have a characteristic that can compensate the dispersion of the single mode optical fiber where the value that the dispersion value is divided by the dispersion slope is about 290 in the wavelength of 1550 nm and about 330 in the wavelength of 1590 nm and are excellent in optical transmission characteristics such as characteristics of losses or polarization mode dispersion.

Additionally, the optical fibers of samples 1 to 3 were connected to the positive dispersion optical fiber to form an optical transmission line. Thereby, it was confirmed that a low dispersion, low non-linear optical line can be created and a broadband wavelength division multiplexing transmission can be realized.

Additionally, the invention is not limited to the embodiment and the sample fabrications, which can adopt various embodiments. For example, in the embodiment and the sample fabrications, they were fabricated by disposing three glass layers inside the reference layer to be a standard of the refractive index distribution, but the optical fiber of the invention may be fabricated by disposing four or more glass layers inside the reference layer. However, it also needs to satisfy the condition of three-layer structure shown in the embodiment in the case of disposing four or more glass layers inside the reference layer.

Furthermore, in the embodiment, the single mode optical fiber having zero dispersion in the waveband of 1.3 μm was exemplified as the positive dispersion optical fiber 11 connected to the optical fiber 12. However, the positive dispersion optical fiber 11 may be an optical fiber having positive dispersion and a positive dispersion slope, which is not limited to the positive dispersion optical fiber shown in the embodiment.

What is claimed is:

1. An optical fiber comprising:
   both dispersion and a dispersion slope in a waveband of 1570 to 1615 nm being negative values;
   a bending loss at a diameter 20 mm in the waveband being 3 dB/m or under;
   a transmission loss in the waveband being 0.3 to 0.8 dB/km, inclusive;
   a value of polarization mode dispersion in the waveband being 0.5 ps·km$^{-½}$ or under;
   a value that an absolute value of a dispersion value is divided by the transmission loss in the waveband being 170 or above; and
   a value that the dispersion value is divided by the dispersion slope in the waveband being 270 to 450, inclusive.

2. The optical fiber according to claim 1 further comprising:
   at least three glass layers disposed inside a reference layer to be a standard of a refractive index profile,
   wherein the three glass layers are a first glass layer at a center side, a second glass layer outside thereof and a third glass layer outside thereof,
   $1.6\% \leq \Delta 1 \leq 2.6\%$, $-0.65\% \leq \Delta 2 \leq -0.4\%$, and $0.15\% \leq \Delta 3 \leq 0.5\%$ are set where a relative refractive index difference of the first glass layer to the reference layer is set $\Delta 1$, a relative refractive index difference of the second glass fiber to the reference layer is set $\Delta 2$, and a relative refractive index difference of the third glass layer to the reference layer is set $\Delta 3$, and
   $2.5 \leq (d2/d1) \leq 3.0$, and $1.5 \leq (d3/d2) \leq 3.0$ are set where an outer diameter of the first glass layer 1 is set d1, an outer diameter of the second glass layer 2 is set d2, and an outer diameter of the third glass layer 3 is set d3.

3. An optical transmission line comprising the optical fiber according to claim 2 as a property improving optical fiber connected to a positive dispersion optical fiber having positive dispersion and a positive dispersion slope,
   wherein a value that a dispersion value is divided by a dispersion slope is 270 to 450, inclusive, in both the positive dispersion optical fiber and the property improving optical fiber a waveband of 1570 to 1615 nm.

4. An optical transmission line comprising the optical fiber according to claim 1 as a property improving optical fiber connected to a positive dispersion optical fiber having positive dispersion and a positive dispersion slope,
   wherein a value that a dispersion value is divided by a dispersion slope is 270 to 450, inclusive, in both the positive dispersion optical fiber and the property improving optical fiber in a waveband of 1570 to 1615 nm.

* * * * *